Patented Nov. 9, 1943

2,333,923

UNITED STATES PATENT OFFICE 2,333,923

POLYESTER-AMIDE

Hugh William Gray, Wilmington, Del., assignor to E. I. du Pont de Nemours & Company, Wilmington, Del., a corporation of Delaware No Drawing. Application December 3, 1941, Serial No. 421,523

6 Claims. (Cl. 260—76)

This invention relates to polymeric materials and more particularly to the production of high molecular weight polyester-amides.

The polymers with which this invention is concerned are those obtained from a mixture of a polyester-forming composition and a polyamide-forming composition which yields a high molecular weight of fiber-forming polymer. The polyamide-forming compositions used are those consisting essentially of bifunctional material in which the molecules contain but two amide-forming groups each of which is complementary to an amide-forming group in other molecules of the polyamide-forming composition. When the polyamide-forming reactants, which as a rule are most conveniently either the readily polymerizable amino acids or the diamine-dibasic carboxylic acid mixtures described in United States Patents 2,071,253 and 2,130,948, are interpolymerized with glycol-dibasic acid mixtures or with other linear polyester-forming compositions, the resulting high molecular weight polyester-amides, although less suitable for the production of textile fibers than the simple polyamides, are valuable for various other purposes because of their somewhat more stretchable and elastic nature.

It has been found previously that when either the above mentioned high molecular weight polyester-amides, which contain both carboxylic ester and carboxylic amide linkages in substantial amount, or the lower molecular weight products obtained by stopping the polymerization reaction before completion, are heated with diisocyanates or diisothiocyanates (which apparently act to couple two short polymer chains to form a longer chain) the resulting polymer is of a definitely rubbery nature. When the polyester-amide is the low molecular weight polymer, the use of either the above reagents or the new agents described herein brings about an additional important advantage in that the impractically long time, several days, required to obtain a high molecular weight polymer by continued heating of the reactants, is very greatly reduced. The agents previously used, however, are expensive and are not readily available.

This invention has as an object an improved method for preparing rubbery polyester-amides. A further object is a process for preparing such polyester-amides in a short reaction cycle by means of readily available and inexpensive agents. Other objects will appear hereinafter.

The above objects are accomplished by heating a linear polyester-amide, preferably in the low molecular weight or incompletely made form previously referred to, with an anhydride of a monocarboxylic acid having a chain length less than six carbon atoms. The best method now known for practicing my invention comprises heating the wax-like incompletely formed polyester-amide having a molecular weight corresponding to an acid number less than 50 and obtained from a mixture of polyester- and polyamide-forming reactants, with the anhydride under conditions which permit escape of volatile product, including some of the anhydride, during the conversion reaction, and continuing the reaction until a rubbery polyester-amide is obtained which does not melt on heating but which becomes sufficiently plastic under heat and pressure to be molded. The resulting rubbery polyester-amide in all probability has a higher molecular weight than the original polyester-amide.

It is to be observed that the anhydrides used in the practice of this invention act differently on the polyester-amides than they do on the straight polyamides where these agents function simply as viscosity stabilizing agents, or on the straight polyesters derived from bifunctional reactants where these agents increase the viscosity but fail to give the essentially infusible products obtained in the case of the polyester-amides.

The low molecular weight or incompletely formed polyester-amides, which are further treated in accordance with the practice of this invention, are waxes or wax-like materials obtained under a heating cycle of six or more hours. The polyester-forming composition used in their preparation should preferably contain a substantially equal number of hydroxyl and carboxyl groups as in the case of a mixture of equimolecular amounts of glycol and dibasic acid. Similarly the polyamide-forming composition used should preferably contain a substantially equal number of amino and carboxyl groups as in the case of a mixture of equimolecular amounts of diamine and dibasic acid. Examples of polyamide-forming compositions are amino acids, an equimolecular mixture of diamine and dibasic carboxylic acid, and preferably the salt formed on initial contact of the two last mentioned reactants. Examples of polyester-forming compositions are hydroxy acids and a mixture of dibasic carboxylic acid and glycol. A mixture of dibasic carboxylic acid and amino alcohol can be used either as the polyester-forming or the polyamide-forming composition, or it can be used alone since it gives a polymer which is essentially a polyester-amide in that it contains both amide and ester groups. It is to be understood that mention of the above reactants is intended to include the equivalent ester-forming and amide-forming derivatives, as for example, the lactones in the case of the hydroxy acids and the lactams in the case of the amino acids.

The addition of amino acid, hydroxy acid, or diamine-dibasic acid salt to the reaction mixture used in preparing the polyester-amide affects the proportion of amide to ester groups but does not upset the molar ratios of the acid to hydroxyl and amino groups since these reactants are in themselves complete polymer-forming compositions.

In preparing the partially made or low molecular weight wax-like polyester-amides the mixture of polyamide-forming and polyester-forming ingredients is heated at a low temperature with care being taken to remove the water or other volatile byproduct of the reaction through a fractionating column at a temperature not above 100° C. in order to prevent loss of low boiling polymer-forming ingredients. The reaction temperature is gradually increased to 210°–260° C., dependent on the stability of the particular polymer being prepared. When the rate of evolution of water or other by-product becomes slow, esterification may be hastened by applying vacuum or by refluxing a water carrier such as toluene or xylene with the reaction mixture. In 6 to 20 hours the acid number of the wax is usually below 20 and the reaction may be stopped.

The monocarboxylic acid anhydrides used in the conversion reaction described herein are prepared by methods well known to the art. The most important of these materials, acetic anhydride, is readily available at low cost.

The procedure and the short time required by the practice of this invention for the conversion of the wax-like, low molecular weight polymer into rubbery thermoplastic products is illustrated by the following treatment of interpolymers prepared from a mixture which contains ethylene glycol and adipic acid in equimolecular proportions and which contains varying amounts of the hexamethylenediamine salt of adipic acid. A sample of the wax is melted at temperatures from 140° to 285° C. and preferably in the range between 180° and 220° C. in a vacuum tight vessel equipped with an agitator, an inlet tube for the addition of anhydride, and an outlet tube for the removal of volatile products. The anhydride is then added to the hot melt. With acetic anhydride the amount added is usually 5% to 10% of the weight of the wax but an excess is not detrimental. The reagent is rapidly stirred into the molten wax which may be at a temperature above the boiling point of the anhydride. The pressure is then reduced below 50 mm. and the excess anhydride and volatile reaction products are distilled off. The melt rapidly increases in viscosity and soon sets to a rubbery mass. Heating is continued for a few minutes to remove the last traces of anhydride and the polymer is then removed from the vessel while still in the hot, thermoplastic state. The entire process usually requires less than one hour. The product is an elastic, tough, transparent mass, very different in properties from the starting material. Thus, whereas the starting material was soluble in acetone, chloroform and particularly in chloroform-methanol mixtures, the product is substantially insoluble in these liquids. Furthermore, whereas the starting material melts to a fluid mass, the product does not melt in the usual sense, although it can be readily molded and pressed into films of high tensile strength and elasticity.

It is sometimes advantageous to add the anhydride to the polymer in several portions, with vacuum being applied between additions to remove volatile products. By changing the components of which the incompletely formed interpolymer is prepared or by altering the ratio of amide to ester groups with a given set of components, the character of the finished product can be varied from very soft, highly elastic products to hard, moderately stiff materials. It is also possible to vary the character of the product from a given wax by altering the conversion conditions. In general, treatment with an anhydride at temperatures of 220° C. or above gives products which are less easily molded and have less elasticity than products converted at temperatures below 200° C. The products prepared at high temperatures are, however, preferable for some purposes, since they retain less permanent elongation when stretched, than the polymers prepared at lower temperatures.

The mechanism of the reaction whereby the anhydride converts the low molecular weight, soluble polyester-amide into a rubbery, insoluble product is not understood. Since the anhydrides used are monofunctional, it does not seem likely that they could effect linking of polymer chains. On the other hand, the change in properties which the polyester-amide undergoes during the short treatment with anhydride suggests that its molecular weight has been markedly increased. Only a small amount of the anhydride is taken up by the polyester-amide; most of the anhydride is recovered in the distillate as such or in the form of the corresponding acid.

The invention is further illustrated by the following examples:

Example I

Twelve hundred parts of partially made interpolymer, prepared from equimolecular portions of ethylene glycol and adipic acid and containing 15% of this weight of hexamethylenediammonium adipate, which possessed an acid number of 12 and a hydroxyl number of 22 was melted at 200° C. To this was added 50 parts of acetic anhydride and the mixture agitated vigorously for 5 minutes. The pressure within the reaction vessel was then lowered to 10 mm. and the volatile products removed and condensed. Heating under reduced pressure was continued for 5 minutes and this cycle then repeated with two additional 50 part portions of anhydride. After complete addition of the anhydride the melt was heated under reduced pressure until no more distillate was obtained. The viscosity of the product had increased by this time to such a degree that stirring was no longer possible. The product was an elastic, tough, pliable substance which could be molded into films having a tensile strength of 1100 lbs./sq. in. and an elongation at break of 700%. Stretching of the films produced a permanent elongation of 400%.

Example II

Thirty parts of a partially made interpolymer, prepared from equimolecular proportions of ethylene glycol and adipic acid containing 15% of this weight of hexamethylenediammonium adipate, which possessed an acid number of 15 and a hydroxyl number of 17.5 was melted at 180° C. To this was added 1.5 parts of methacrylic anhydride, the mixture stirred vigorously for 2 minutes, and the pressure then reduced to 5 mm. for 5 minutes. This cycle was repeated twice using similar portions of the anhydride. The melt increased in viscosity rapidly. After complete addition of the reagent, heating was continued for ten minutes. At the end of this time the melt had set to a rubbery mass which when cold was tough, elastic and pliable. A film molded from this product had a tensile strength of 2000 lbs./sq. in. and an elongation of 780% at break.

Example III

Fifteen parts of the incompletely formed interpolymer described in Example II was melted at 210° C. and 1 part of methoxyacetic anhydride added. The melt was stirred vigorously for one minute and the pressure then reduced to 5 mm. for 10 minutes. One part of anhydride was then added and stirred into the melt. The pressure was again reduced to 5 mm. and after 10 minutes the melt became a viscous, elastic mass. The product was tough, elastic and flexible.

Example IV

A low molecular weight interpolymer prepared by heating delta-valerolactone and 15% of its weight of hexamethylenediammonium adipate for 20 hours at 218° C. was melted at 200° C. To 15 parts of this waxy interpolymer was added 1 part of acetic anhydride, the mixture stirred vigorously for one minute, and then heated under 10 mm. pressure for 5 minutes. One part of acetic anhydride was then added, heating continued for 1 minute and the pressure again reduced. After 15 minutes the melt set to a stiff, rubbery mass. The product could be molded into a film having a tensile strength of 16000 lbs./sq. in. and an elongation of 710%.

Example V

Twenty-five parts of a polymer, which was prepared from equimolar portions of ethylene glycol and adipic acid and 30% of this weight of hexamethylenediammonium adipate and which had an intrinsic viscosity of 0.54, was heated to a fluid mass at 180° C. To this was added 2 parts of acetic anhydride, the mixture stirred and heated for 5 minutes and the pressure reduced to 5 mm. After heating for 40 minutes, one part of acetic anhydride was added, stirred in and heating continued under reduced pressure for 30 minutes. The product was now a tough, elastic mass from which films with a tensile strength of 2200 lbs./sq. in. and an elongation of 750% could be molded. The intrinsic viscosity of the product, defined as in U. S. Patent 2,130,948, was 0.62.

Example VI

The low molecular weight interpolymer used in this experiment was made from ethylene glycol, ethanolamine, and adipic acid in such quantities that the sum of the glycol and amine was molecularly equivalent to that of the acid and the ratio of the weight of amine to glycol was 1:1.75. Thirty-five parts of this product, which had an acid number of 20 and a hydroxyl number of 36, was heated to 210° C. and 2 parts of acetic anhydride added. The mixture was then stirred vigorously for 1 minute and the pressure reduced to 10 mm. After 5 minutes the vacuum was released and 3 parts of anhydride added. This was stirred in and the pressure reduced as before. Three additional parts of anhydride was added after 5 minutes and the evacuation repeated. After 35 minutes total heating time, the reaction mixture set to a soft, rubbery mass.

Example VII

Thirty parts of an incompletely prepared interpolymer made from equimolar portions of 2,2-dimethylpropanediol-1,3 and adipic acid and 4.5 parts of hexamethylenediammonium adipate was melted at 180° C. One part of acetic anhydride was added, the mixture stirred for 5 minutes and the pressure reduced to 5 mm. After 15 minutes, 1 part of acetic anhydride was added and the vacuum treatment repeated for 10 minutes. Two parts of anhydride were then added and the mixture heated under reduced pressure for 40 minutes. The product was soft, rubbery, and easily elongated.

Example VIII

Twenty parts of an incompletely formed interpolymer made from equimolar portions of ethylene glycol and adipic acid and 15% of this weight of hexemethylenediammonium adipate was mixed with 2 parts of acetic anhydride and the mixture heated at 142° C. for 20 minutes and then for 10 minutes at 180° C. The pressure was then reduced to 5 mm. and heating continued at 180° C. for 1 hour. The product was a tough, flexible solid which softened at about 75° C. but did not melt even at 175° C.

Example IX

A polymer was prepared by heating 80 parts of hydroxyacetic acid with 20 parts of hexamethylenediammonium adipate at atmospheric pressure for 5 hours and then at 15 mm. pressure for 43 hours, all at 160° C. This material was a hard, brittle, opaque, cream-colored solid melting at 126° C. The parts of this brittle solid was heated at 160° C. under atmospheric pressure, one part of acetic anhydride was added, and the mixture was stirred for one minute. The pressure within the reaction vessel was reduced to about 15 mm. and the mixture was stirred at this pressure for about 10 minutes to facilitate removal of the volatile reaction products. This cycle was repeated with three additional 1 part portions of acetic anhydride. At this point the fluid melt set to a stiff, rubbery mass. The product was a tough, pliable substance which could be molded into films having a tensile strength of 2500 lbs./sq. in. and an elongation at break of 120%.

The polyester- and polyamide-forming compositions are best chosen such that the ratio of ester to amide groups is not substantially greater than 10:1 nor substantially less than 1:10. The preferred range is between 8:1 and 1.2:1.

Typical polyester-forming reactants which are useful in this invention are described in United States Patents 2,071,250 and 2,224,037. When the polyester-forming composition is a hydroxy acid, the preferred acids are those of formula HORCOOH, where R is a divalent organic radical having a chain length of at least 4 atoms. As examples of such acids may be mentioned 5-hydroxyvaleric acid and its lactone 6-hydroxycaproic acid, 12-hydroxystearic acid, p-hydroxymethyl benzoic acid, and o-(beta-hydroxyethoxy)benzoic acid. As indicated in Example IX, however, hydroxyacetic acid which contains only one atom in the chain separating the hydroxyl and carboxyl groups is also very useful. The preferred dibasic acids for use in the dibasic acid-glycol polyester-forming compositions are those of the formula

HOOCR'COOH where R' is a divalent organic radical having a chain of at least 3 atoms. Typical acids of this type are glutaric, adipic, sebacic, diglycolic, terephthalic and diphenic acids. However, acids such as oxalic and malonic can also be used. The preferred glycols have the general formula HOR"OH where R" is a divalent organic radical having a chain length of at least 2 atoms. These include ethylene glycol, propylene glycol, 2,2-dimethylpropanediol-1,3, hexamethylene glycol, octadecanediol, diethylene glycol, triethylene glycol, and N - phenyldiethanolamine. Monoaminomonohydric alcohol-dibasic acid mixtures, as already indicated, can serve either or both as polyester-forming or polyamide-forming compositions. The dibasic acids mentioned above can be used in these compositions. The preferred amino alcohols have the formula HOR'''NH$_2$ where R''' is a divalent hydrocarbon radical with a chain length of at least 2 carbon atoms. Examples are ethanolamine, 3-aminopropanol, 6-amino-hexanol and p-aminomethyl benzyl alcohol.

Typical polyamide-forming compositions which can be used in the process of this invention are described in United States Patents 2,071,253, 2,130,948 and 2,191,556. Examples of monoaminomonocarboxylic acids which can be used as the polyamide-forming compositions may be mentioned 6-aminocaproic acid, 9-aminononoic acid, and 12-aminostearic acid as well as a large number of other readily polymerizable amino acids, i. e., those having at least 5 atoms in the chain separating the amide-forming groups. The preferred polyamide-forming compositions are those which contain diamines and dibasic acids. Examples of diamines which can be used are ethylenediamine, hexamethylenediamine, decamethylenediamine, para-xylylenediamine, and triglycoldiamine. Examples of suitable dibasic acids are adipic, sebacic, diglycolic and those mentioned above in connection with the polyester-forming reactants.

It should be understood that mention of acids in connection with the polyester-forming compositions includes ester-forming derivatives of the acids, e. g., the mono- and di-esters with monohydric alcohols. Similarly the mention of acids and diamines in connection with the polyamide-forming compositions includes the amide-forming derivatives thereof. The amide-forming derivatives which can be used in place of the amino acids include the esters, anhydrides, amides, lactams, acid halides, N-formyl derivatives, carbamates and nitriles in the presence of water, and the corresponding aminocarbothiolic acids or esters thereof. The amide-forming derivatives of the dibasic carboxylic acids comprise the mono- and di-esters, the anhydrides, the mono- and di-amides, the acid halides, the corresponding dicarbothiolic acids, and the following compounds in the presence of water: nitriles, cyanocarboxylic acids, cayanoamide, and cyclic imide. Amide-forming derivatives of the diamines include the carbamate, N-formyl derivative and the N,N'-diformyl derivative.

In addition to the monocarboxylic acid anhydrides mentioned in the foregoing examples other anhydrides suitable for the present purpose are propionic, butyric, isobutyric, acrylic, crotonic, alkoxyacetic, alkoxypropionic and similar active aliphatic anhydrides of monocarboxylic acids with a chain length less than 6 carbon atoms. Also included are mixed anhydrides such as those from acetic and propionic, butyric and acrylic, acetic and methacrylic acids, and the numerous other combinations preparable from the class of acids already defined.

The temperatures used in the practice of this invention can vary from about 100° C. up to the decomposition point of the polymer. The pressures employed can vary from a fraction of a millimeter to atmospheric but are preferably kept below 50 mm. Concentration of anhydride used can be varied from one per cent to several hundred per cent of the weight of the polyester-amide treated.

The excessively long time previously required for the conversion of the wax-like, low molecular weight polyester-amides to a rubbery product is greatly reduced through the practice of this invention, in some instances to 5 or 10 minutes and at most not longer than a few hours, by means of inexpensive and readily available compounds.

The products of this invention are useful in the production of filaments, films, tubing and solvent and oil resistant coating agents, e. g., for cloth, paper, leather, wood, metal and wire (as electrical insulation). They are also useful in the manufacture of safety glass interlayers. In these and other uses the products may be admixed with other polymers, resins, plasticizers, fillers, pigments, dyes, etc., either before or after the anhydride treatment.

As many apparently widely different embodiments of this invention may be made without departing from the spirit and scope thereof, it is to be understood that I do not limit myself to the specific embodiments thereof except as defined in the appended claims.

I claim:

1. In a process for making more rubber-like a wax-like, further polymerizable polyester-amide containing in substantial amount both carboxylic ester and carboxylic amide linkages, the step which comprises heating said wax-like linear polyester-amide at polymerization temperature in the presence of an anhydride of a monocarboxylic acid having a chain length of not more than six carbon atoms, and under conditions permitting the removal of volatile products.

2. A process for converting to a rubbery product a wax-like, further polymerizable, chloroform soluble linear polyester-amide containing in substantial amount both carboxylic ester and carboxylic amide linkages, said process comprising heating at polymerization temperature said wax-like polyester-amide in the presence of an anhydride of a monocarboxylic acid having a chain length of not more than six carbon atoms, and continuing the heating under reduced pressure with removal of volatile reaction products and excess anhydride until the polyester-amide is no longer substantially soluble in chloroform.

3. The process set forth in claim 2 in which said anhydride is acetic anhydride.

4. The process set forth in claim 2 in which the temperature is between 180° and 220° C.

5. The process set forth in claim 1 in which said polyester-amide is the reaction product of a mixture of dibasic carboxylic acid and a monoaminomonohydric alcohol.

6. The process set forth in claim 2 in which said polyester-amide is the reaction product of a mixture of dibasic carboxylic acid and a monoaminomonohydric alcohol.

HUGH WILLIAM GRAY.

CERTIFICATE OF CORRECTION.

Patent No. 2,333,923. November 9, 1943.

HUGH WILLIAM GRAY.

It is hereby certified that error appears in the printed specification of the above numbered patent requiring correction as follows: Page 3, second column, line 24, for "hexemethylenediammonium" read --hexamethylenediammonium--; line 40, for "The" read --Ten--; page 4, first column, line 64, for "cayanoamide" read --cyanoamide--; and that the said Letters Patent should be read with this correction therein that the same may conform to the record of the case in the Patent Office.

Signed and sealed this 14th day of December, A. D. 1943.

(Seal)

Henry Van Arsdale,
Acting Commissioner of Patents.